July 30, 1957      S. MELITA      2,800,843
ATTACHMENTS FOR A SELF-DEVELOPING CAMERA Filed July 25, 1955      2 Sheets-Sheet 1

INVENTOR.
SEBASTIANO MELITA
BY
Anthony J. Turchetti
HIS ATTORNEY.

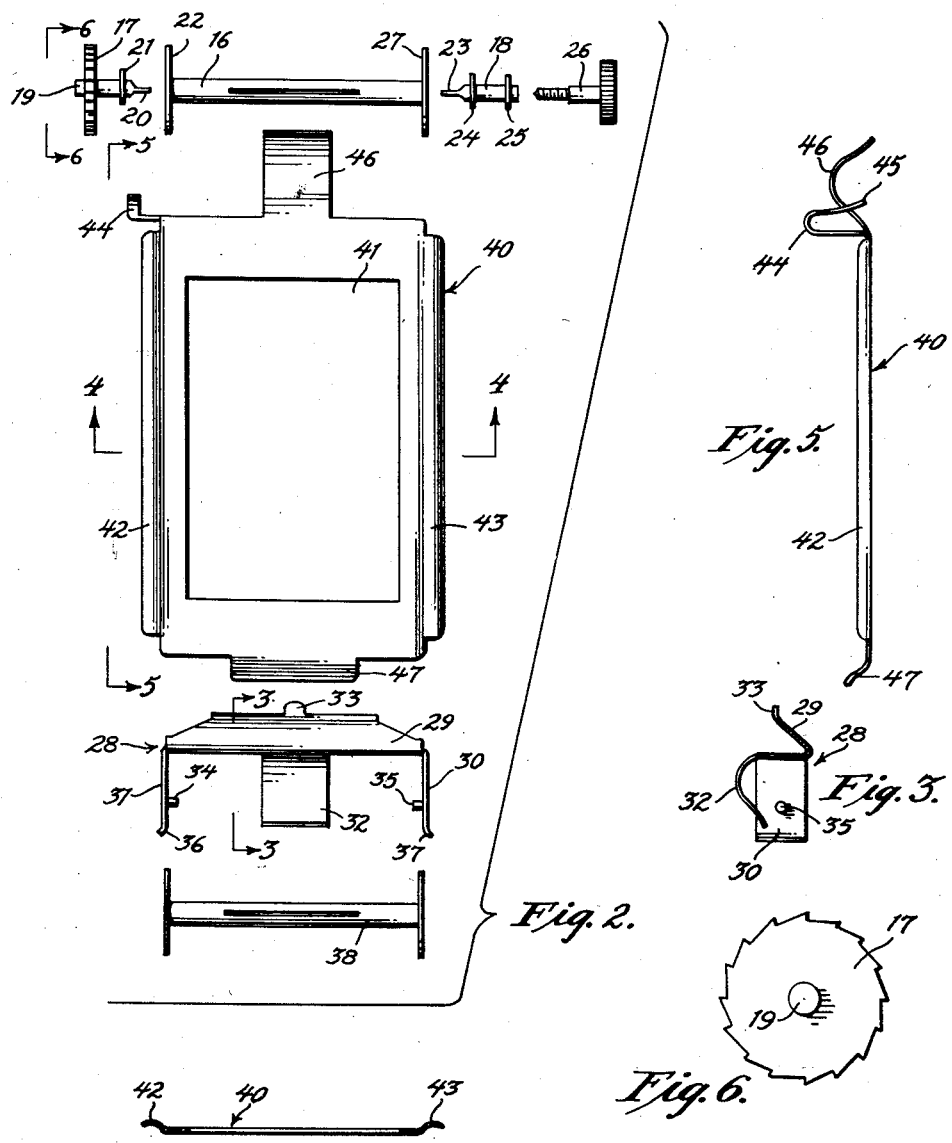

United States Patent Office 2,800,843
Patented July 30, 1957

2,800,843

ATTACHMENTS FOR A SELF-DEVELOPING CAMERA

Sebastiano Melita, Philadelphia, Pa., assignor of one-half to Anthony J. Turchetti, Philadelphia, Pa.

Application July 25, 1955, Serial No. 524,022

7 Claims. (Cl. 95—31)

This invention relates to photographic apparatus, and particularly to apparatus for use with a self-developing camera to permit the use of conventional black and white, or colored films therewith.

Self-developing cameras, such as the currently popular "Polaroid Land Camera," use special type of film which carries its own developer in the nature of a jelly-like substance. Due to the unique structure of this film and its highly sensitive nature, it is extremely difficult, if not impossible, to save the negatives for future reproductions. In addition, these cameras have not been usable with conventional black and white, or colored film, due to the oversize and peculiar structure thereof, rendering them adaptable only for use with the special self-developing film. These conditions have discouraged the average amateur photographer from owning a self-developing camera of this type, for such a camera, in consideration of its relative high cost, represents a luxury amongst photographers. Thus, while it might be novel and expedient to own a camera which produces a fully developed picture in a matter of seconds after the film is exposed, to some it is considered uneconomical and perhaps extravagant to own a camera of such limited usage.

With the above in mind, it is the basic objective of the present invention to provide attachments for a self-developing camera of the "Polaroid Land Camera" type to modify such a camera for use with conventional black and white, or colored film.

It is another object of this invention to provide attachments for a self-developing camera of the "Polaroid Land Camera" type which will permit the use thereof for taking photographs in the conventional manner with conventional film.

It is a further object of this invention to provide attachments for a self-developing camera of the "Polaroid Land Camera" type which are easily attachable and detachable therewith to enable the ready conversion of such camera for use with conventional film.

Another object of this invention is to provide such attachments for a self-developing camera of the "Polaroid Land Camera" type which are simple in construction, easy to use, and low cost.

These objects, together with other objectives and advantages to be derived from the present invention will at once become apparent from a reference to the following detailed description and accompanying drawings, wherein similar numerals refer to similar parts throughout the several views.

Figure 2 is a plan view of some of the attachments of the present invention shown in exploded relationship.

Figure 3 is a cross-sectional view of a film reel holder taken along the line 3—3 of Fig. 2.

Figure 4 is a cross-sectional view of a film adapter taken along the line 4—4 of Fig. 2.

Figure 5 is a side elevational view of the film adapter taken along the line 5—5 of Fig. 2.

Figure 6 is a side view of a ratchet wheel as viewed from the direction 6—6 in Fig. 2.

Figure 1:
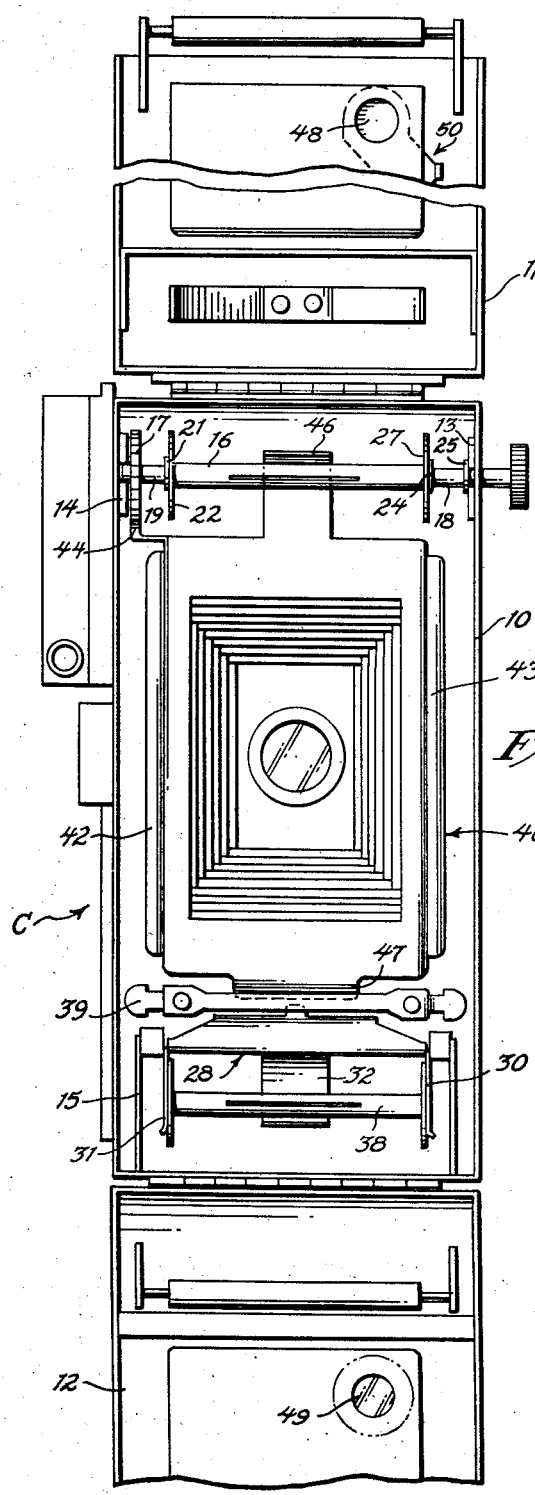
Figure 1 is a plan view of a self-developing camera of the "Polaroid Land Camera" type with the camera parts open and with parts broken away so as to show the inside thereof, and illustrating the attachments of the present invention in their assembled relationship therewith.

Referring to the drawings, a self-developing camera of the "Polaroid Land Camera" type is referred to in its entirety in Fig. 1 by the letter "C." This camera C is shown as consisting of a main exposure chamber 10, an inner cover 11, and an outer cover 12. The chamber 10 is actually the front part of the camera, while the outer cover 12 is the back thereof, as normally viewed from the outside of the camera in normal usage. In the main exposure chamber 10, 13 and 14 represent bosses ordinarily used to support the self-developing film, while the bracket 15 represents the self-developing film support at the opposite end of said chamber 10. A cross-bar resides in the bottom of the main chamber 10 as a conventional part of this camera, and is utilized in the present invention in a manner to be described below.

To be able to use the camera C with conventional black and white, or colored film, it is first necessary to provide support means for such films, which are of a narrower width than the self-developing film. It will also be necessary to provide means for advancing the film roll in the conventional manner, since the self-developing camera is not adapted for such usage, the ordinary self-developing film being "pulled" from the camera to advance the film. In addition, an adapter must be used to reduce the exposure area of the chamber 10 to a size comparable to the conventional film size used.

These various means for accommodating a conventional film, as above-described, are found in the attachment combination shown in exploded relationship in Fig. 2, and in assembled relationship in Fig. 1. Referring to Figs. 1 and 2, a film reel 16 of conventional size is supported from the bosses 13 and 14 by means of the ratchet member 17 and spacer 18. The ratchet member 17 is fixedly mounted on a shaft 19 having a flat end 20 and a circumferential flange 21 adjacent to said flat end 20. The flat end 20 is adapted to be received in an elongated opening found in the ends of the film reels 16 with the flange 21 bearing firmly against the reel flange 22. The end of the shaft 19 remote from the flat end 20 is received in a U-shaped slot in the boss 14. The spacer 18 also has a flat end 23 and a pair of spaced circumferential flanges 24 and 25. The end of said spacer remote from the flat end 23 is bored and tapped for receiving the knurled thumbscrew 26 which passes through the wall of the chamber 10 from the outside thereof, as shown in Fig. 1. The tapped end of the spacer 18 adjacent to the flange 25 is supported by the boss 13 in a U-shaped slot provided therefor, said flange bearing against the said boss. The flat end 23 is received in an elongated opening in the end of reel 16 with the flange 24 bearing against the reel flange 27. In this manner, the reel is provided of a size sufficient to accommodate a roll of film of standard size.

In order to support a roll of film of standard or conventional size, such as the standard number 616 film, a roll bracket 28 is provided which is adapted to clampingly engage the bracket 15 in the main exposure chamber 10 of the camera C, as shown in Figs. 1 and 2. This roll bracket 28 consists of an inverted V-shaped wall 29 having side arms 30 and 31, a roll support 32, and a small locking tab 33 projecting therefrom. The side arms 30 and 31 are provided with projecting lugs 34 and 35 which are in direct alignment, and are flared outwardly from one another along their free ends 36 and 37. This flaring facilitates the insertion and removal of the roll of film. Thus, a roll of film carried by a film reel 38 is supported by the bracket 28 by merely spreading the side arms 30 and 31 sufficiently to insert said reel until the lugs 34 and 35 are received in apertures normally provided therefor in the reel ends. At the same time, the roll support 32, which resides under the roll, will exert a light bearing pressure on the film to prevent the loosening thereof with respect to the reel. The lock tab 33 on the wall 29 is wedgingly received beneath a cross-bar 39 in the main chamber 10, thus locking the roll bracket 28 in place against movement.

Cooperating with the support members for the reel 16 and the roll bracket 28 is a substantially rectangular adapter mask 40 which performs the function of reducing the exposure area of the chamber 10 to a size comparable to the conventional film size. This mask 40 is provided with a rectangular opening 41 corresponding to the size of photograph desired, and has opposed arcuate edges 42 and 43 which aid in firmly attaching said mask to the camera structure. It will be noted that it is the edges of the longer sides of the rectangular mask 40 that are so constructed. Projecting from one corner of the mask 40, in substantially perpendicular relationship to the plane thereof, is a U-shaped finger 44 having a free end 45 which is adapted to engage the ratchet 17 for a purpose to be described below. Centrally located on the edge of the bracket 40 from which the finger 44 projects is a bowed ribbon extension 46 which, like the roll support 32, exerts a retaining pressure on the film as it is received on the reel 16. On the edge of the mask 40 opposite from the bowed ribbon extension 46 is a retaining tab 47 which is adapted to be received beneath the cross-bar 39 in the main exposure chamber 10 so as to firmly retain the said mask in its assembled position in much the same manner as the tab 33 on the roll bracket 28.

Since the self-developing camera does not operate on the conventional roll-to-roll technique, insofar as positioning the film for exposure is concerned, it is necessary to provide film-viewing windows in the camera body to enable the user to properly position the film for each exposure. Thus, such a window must be provided in the inner cover 11 and outer cover 12, as indicated at 48 and 49, respectively, in Fig. 1. Each of these windows must, however, be provided with closure members to close said windows when the camera C is being used as a self-developing camera so as to preclude the seepage of any light into the camera interior. In this respect, a soft washer made from sponge rubber, felt or the like may be placed about the window 49 in the outer cover 12, as indicated in phantom in Fig. 1.

Figure 8:
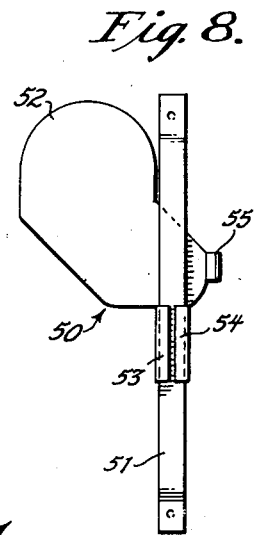
Figure 8 is a plan view of a slidable cover mechanism for covering the film-viewing window provided in the inner cover of the camera.
Figure 7:
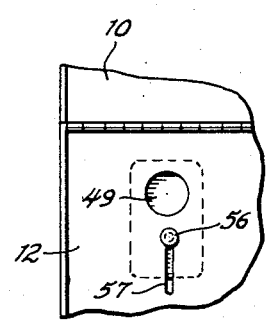
Figure 7 is a plan view of the film-viewing window provided in the outer cover of the camera.

A closure member 50 for the window is illustrated in Fig. 8 as consisting of a flat stationary rail 51 upon which slides a flat plate 52 residing beneath the rail 51 and being folded up over said rail as at 53 and 54. A finger tab 55 on the plate 52 permits of the easy manipulation thereof. A closure member for the window 49 may also take the form of a slide member controlled from the outside of the outer cover 12 by means of button 56, or the like, slidable in a slot 57, as shown in Fig. 7.

It is to be noted that instead of film viewing windows, automatic film spacing means may be incorporated into the film turning mechanism, as is often found as conventional equipment in cameras.

*Operation*

Although the manner in which a self-developing camera of the "Polaroid Land Camera" type may be converted to usage for conventional black and white, or colored film is quite apparent from the above detailed description of the present invention, a brief discussion of how this is accomplished will now be given for the sake of completeness and clarity.

First of all, if film-viewing windows are to be used, the inner cover 11 and outer cover 12 must accordingly be drilled and provided with the closure members described above and shown in Figs. 7 and 8. Then the side wall of the main exposure chamber 10 must be drilled adjacent to the U-shaped slot in the boss 13 to permit the insertion of the threaded end of the thumbscrew 26 therethrough in assembly, as will be described below.

Next the mask 40 is positioned by first inserting the retaining tab 47 beneath the cross-bar 39 and then pressing said mask downwardly so that its arcuate edges 42 and 43 seat themselves on the body structure of the main exposure chamber 10, as depicted in Fig. 1.

Next, the flat ends 20 and 23 of the ratchet member 17 and spacer 18, respectively, are inserted into the existing elongated slots in the film reel 16, and the said ratchet member and spacer ends are dropped into the U-shaped slots of the bosses 13 and 14. In this position, the reel 16 will reside above the bowed extension of the mask 40. The thumbscrew 26 is then inserted through the opening made in the wall of the chamber 10 near the boss 13 into the tapped bore of the spacer 18, and said thumbscrew is threaded thereinto until seizure occurs with subsequent turning of the reel 16. At the same time, it will be noted that the end 45 of the mask finger 44 will engage the teeth of the ratchet member 17. Thus, unwinding of film from reel 16 is precluded.

Finally, the roll bracket 28 is attached by first inserting the locking tab 33 on the wall 29 beneath the cross-bar 39, pressing downwardly until the bracket snaps in place upon the chamber bracket 15. A roll of film may then be loaded into the camera by spreading apart the arms 30 and 31 of the roll bracket 28 and inserting the roll until the lugs 34 and 35 seat themselves in the ends of the film reel 38. The free end of the film is then attached to the reel 16 in the conventional manner and the camera closed. Before closing the camera, the washer should be placed about the window 49. The thumbscrew 26 may then be turned until the numeral "one" appears in the windows to indicate that the film is positioned for its first exposure.

From the above description of the present invention, it is seen that the conversion of a self-developing camera of the "Polaroid Land Camera" type for use with conventional black and white, or colored film, at will, can be a simple matter. And this can be accomplished with so few and simple attachments as to be economical. Needless to say, the potential marketability of such cameras would be greatly increased, while at the same time providing the owner of such a camera with a most versatile camera.

Although the present discussion of this invention has been limited to the above-described preferred embodiment, variations thereof are possible without departing from the spirit of the invention. It is to be understood, therefore, that the invention is not to be limited to the particular embodiment disclosed, but rather only to the inventive concept as defined by the appended claims.

What is claimed is:

1. In combination with a self-developing camera, said camera having an exposure chamber with side walls and end walls and bosses on said side walls at one end of said chamber, a removable adapting set to adapt said camera for use with conventional film at the user's option, said adapting set comprising, a ratchet spacer and spacer bar removably mounted in said bosses and rotatably supporting therebetween a conventional film reel, means for turning said film reel, removable adapter means for a conventional film roll in the opposite end of said chamber, and a removable adapter mask for reducing the camera exposure area to a size comparable to conventional film size, said mask lying between said film reel and film roll adapter means and cooperating with said ratchet spacer to prevent the unwinding of film from about said film reel.

2. In combination with a self-developing camera, said camera having an exposure chamber with side walls and end walls and bosses on said side walls at one end of said chamber, a removable adapting set to adapt said camera for use with conventional film at the user's option, said adapting set comprising, a ratchet spacer and spacer bar removably mounted in said bosses and rotatably supporting a conventional film reel therebetween, means for turning said film reel, removable adapter means for a conventional film roll in the opposite end of said chamber, a removable adapter mask for reducing the camera exposure area to a size comparable to conventional film size, said mask lying between said film reel and film roll adapter means, and a finger depending from said adapter mask and engaging said ratchet spacer so as to prevent the unwinding of film from about said reel.

3. In combination with a self-developing camera, said camera having an exposure chamber with side walls and end walls and bosses on said side walls at one end of said chamber, a removable adapting set to adapt said camera for use with conventional film at the user's option, said adapting set comprising, a ratchet spacer and spacer bar removably mounted in said bosses and rotatably supporting a conventional film reel therebetween, means for turning said film reel, removable adapter means for a conventional film roll in the opposite end of said chamber, a removable adapter mask for reducing the camera exposure area to a size comparable to conventional film size, said mask lying between said film reel and film roll adapter means, a finger depending from said adapter mask and engaging said ratchet spacer, and a bowed extension on said adapter mask and lying beneath said film reel.

4. In combination with a self-developing camera, said camera having an exposure chamber with side walls and end walls and bosses on said side walls at one end of said chamber; a removable adapting set to adapt said camera for use with conventional film at the user's option, said adapting set comprising; a ratchet spacer and spacer bar removably mounted in said bosses and rotatably supporting a conventional film reel therebetween; means for turning said film reel; a removable adapter for supporting a conventional film roll in the opposite end of said chamber, said adapter comprising a V-shaped member having a pair of reel-carrying spaced arms projecting therefrom; and a removable adapter mask lying between said film reel and removable adapter for reducing the camera exposure area to a size comparable to conventional film size, said mask comprising a substantially rectangular sheet having an opening therein, and a U-shaped finger projecting from one corner thereof and engaging said ratchet spacer so as to prevent the unwinding of film from about said reel.

5. In combination with a self-developing camera, said camera having an exposure chamber with side walls and end walls and bosses on said side walls at one end of said chamber; a removable adapting set to adapt said camera for use with conventional film at the user's option, said adapting set comprising; a ratchet spacer and spacer bar removably mounted in said bosses and rotatably supporting a conventional film reel therebetween, said spacer bar being bored and tapped in the end residing in one of said bosses; a thumbscrew projecting through one side wall of said exposure chamber and being threadably received in the tapped bore of said spacer bar for causing rotation of said reel; a removable adapter for supporting a conventional film roll in the opposite end of said chamber, said adapter comprising a V-shaped member having a pair of spaced arms projecting there- from and a pair of reel-carrying lugs extending from said arms; and a removable adapter mask lying between said film reel and removable adapter for reducing the camera exposure area to a size comparable to conventional film size, said mask comprising a substantially rectangular sheet having an opening therein, and a U-shaped finger projecting from one corner thereof and engaging said ratchet spacer so as to prevent the unwinding of film from about said reel.

6. In combination with a self-developing camera, said camera having an exposure chamber with side walls and end walls and bosses on said side walls at one end of said chamber and having a laterally mounted cross-bar at the opposite end of said chamber; a removable adapting set to adapt said camera for use with conventional film at the user's option, said adapting set comprising; a ratchet spacer and spacer bar removably mounted in said bosses and rotatably supporting a conventional film reel therebetween, said spacer bar being bored and tapped in the end residing in one of said bosses; a thumbscrew projecting through one side wall of said exposure chamber and being threadably received in the tapped bore of said spacer bar for causing rotation of said reel; a removable adapter for supporting a conventional film roll in the opposite end of said chamber, said adapter comprising a V-shaped member having a pair of spaced arms projecting from its lateral extremities with a pair of reel-carrying lugs extending from said arms, and a lock tab projecting from its lateral edge and being received beneath said cross-bar so as to lock said adapter in place; and a removable adapter mask lying between said film reel and removable adapter for reducing the camera exposure area to a size comparable to conventional film size, said mask comprising a substantially rectangular sheet having an opening therein, a U-shaped finger projecting from one corner thereof and engaging said ratchet spacer so as to prevent the unwinding of film from about said reel, a bowed extension on said mask adjacent to said finger and residing beneath said reel, and a retaining tab on the end of said mask remote from said finger and residing beneath said cross-bar so as to retain the mask in assembled relationship.

7. In combination with a self-developing camera, said camera having an exposure chamber with side walls and end walls and bosses on said side walls at one end of said chamber, and having an inner cover over said chamber and an outer cover over said inner cover; an adapting set to adapt said camera for use with conventional film at the user's option, said adapting set comprising; a ratchet spacer and spacer bar removably mounted in said bosses and rotatably supporting a conventional film reel therebetween; means for turning said film reel; a removable adapter for supporting a conventional film roll in the opposite end of said chamber, said adapter comprising a V-shaped member having a pair of reel-carrying arms projecting from its lateral extremities; a removable adapter mask lying between said film reel and removable adapter for reducing the camera exposure area to a size comparable to conventional film size, said mask comprising a substantially rectangular sheet having an opening therein, and a U-shaped finger projecting from one corner thereof and engaging said ratchet spacer so as to prevent the unwinding of film from about said reel; and means associated with said inner and outer covers for determining the position of film relative to the adapter mask opening.

References Cited in the file of this patent

UNITED STATES PATENTS 2,210,988    Shelton  ---------------- Aug. 13, 1940
2,238,191    Shelton  ---------------- Apr. 15, 1941